United States Patent
Matejcek et al.

(10) Patent No.: US 6,565,998 B2
(45) Date of Patent: May 20, 2003

(54) DIRECT METHANOL FUEL CELL SYSTEM WITH A DEVICE FOR THE SEPARATION OF THE METHANOL AND WATER MIXTURE

(75) Inventors: Lothar Matejcek, Mommenheim (DE); Martin Wohr, Pittsford, NY (US)

(73) Assignee: General Motors Corporation, Detroit, MI (US)

( * ) Notice: Subject to any disclaimer, the term of this patent is extended or adjusted under 35 U.S.C. 154(b) by 61 days.

(21) Appl. No.: 09/778,156

(22) Filed: Feb. 7, 2001

(65) Prior Publication Data

US 2002/0106542 A1 Aug. 8, 2002

(51) Int. Cl.⁷ .......................... H01M 8/04; H01M 8/12; H01M 8/10
(52) U.S. Cl. .............................. 429/22; 429/17; 429/23; 429/30
(58) Field of Search ............................. 429/12, 13, 17, 429/22, 23, 30

(56) References Cited

U.S. PATENT DOCUMENTS

| | | | |
|---|---|---|---|
| 5,132,193 A | * 7/1992 | Reddy et al. | 429/13 |
| 5,366,821 A | * 11/1994 | Merritt et al. | 429/21 |
| 5,672,439 A | * 9/1997 | Wilkinson et al. | 429/30 |
| 5,766,786 A | * 6/1998 | Fleck et al. | 429/17 |
| 5,780,981 A | * 7/1998 | Sonntag et al. | 318/139 |
| 5,981,096 A | * 11/1999 | Hornburg et al. | 429/17 |
| 6,045,933 A | * 4/2000 | Okamoto | 429/17 |
| 6,165,633 A | * 12/2000 | Negishi | 423/651 |
| 6,303,244 B1 | * 10/2001 | Surampudi et al. | 429/17 |

FOREIGN PATENT DOCUMENTS

| | | |
|---|---|---|
| DE | 4318818 | 5/1995 |
| DE | 4425634 | 10/1995 |
| DE | 4329323 | 5/1996 |
| DE | 19802038 | 7/1999 |
| EP | 0181569 | 10/1985 |
| EP | 0629014 | 5/1994 |
| EP | 0693793 | 6/1995 |

OTHER PUBLICATIONS

Manfred Waidhas: "Methanol–Brennstoffzellen" (Methanol Fuel Cells) published in Brennstoffzellen: Entwicklung, Technologie, Anwendung/Konstantin Ledjeff (editor), first edition, Heidelberg: Müllelr, 1995 ISBN 3–7880–7514–7, pp. 137, 148.

* cited by examiner

Primary Examiner—Carol Chaney
Assistant Examiner—Donald V. Scaltrito
(74) Attorney, Agent, or Firm—Cary W. Brooks

(57) ABSTRACT

A fuel cell system is described with a so-called direct methanol fuel cell (DMFC). To minimize the methanol crossover the concentration of the methanol/water mixture supplied to the anode of the fuel cell is made dependent on the magnitude of the electrical power takeoff. In order to be able to adapt the concentration of the methanol quickly in the case of a load change, it is proposed that a separating column be introduced into the anode cycle which reduces the concentration of the methanol. To achieve adapted increases in the concentration of methanol, both a concentrated methanol/water mixture from a secondary cycle and possibly additionally pure methanol from a tank are supplied. In the case of a reduction in the power demand only the secondary cycle needs to be blocked with the result that a lean mixture is available immediately.

16 Claims, 1 Drawing Sheet

DIRECT METHANOL FUEL CELL SYSTEM WITH A DEVICE FOR THE SEPARATION OF THE METHANOL AND WATER MIXTURE

TECHNICAL FIELD

The invention concerns a fuel cell with an anode and a cathode and a polymer electrolyte arranged between them, said anode being in contact with a fuel cell distribution system having an inlet and an outlet so that fuel can penetrate to the anode from said system, said fuel distribution system being arranged in an anode circulation system containing a methanol/water mixture and with a first metering device for supplying methanol to the anode cycle.

BACKGROUND OF THE INVENTION

Such fuel cells are called direct methanol fuel cells (DMFC) because methanol is supplied directly to the anode and is oxidized there. This procedure has the advantage over a fuel cell operated with hydrogen at the anode that a separate device for reforming the methanol into hydrogen can be omitted. The problem of this technology, however, is the fact that until now no membrane totally impermeable to methanol has been available.

In the previously used membranes permeable for methanol, a methanol loss flow appears, the so-called methanol crossover, which reduces the power and efficiency of the DMFC. In order to keep the crossover as small as possible, the methanol concentration in the methanol/water mixture is adjusted to a relatively low level, on the one hand, and on the other hand, it is adapted to the electric power consumption. However, several problems arise in this case especially in the case of rapid load changes, which are important above all when the DMFC is used to drive a motor vehicle.

These problems also arise whenever hydrocarbons other than methanol are used. For this reason in this application, methanol is used as a representative for these other hydrocarbons so that the scope of protection should not be considered to be limited to the use of methanol.

The above mentioned adaptation of the concentration to the power taken from the fuel cell is essentially proportional: for a high electric power consumption the concentration is raised and for a lower power consumption the concentration is lowered again. The concentration can be raised relatively simply by adding pure methanol to the anode cycle (a.k.a. fuel supply circuit) which enables a rapid adaptation in time. The concentration cannot be lowered so quickly. It is therefore achieved by stopping the methanol supply in such a case so that the methanol is gradually consumed in the anode cycle. In this case the concentration changes only slowly, however, for the following reasons: for a homogeneous methanol concentration inside the fuel cell, it is necessary for the methanol to be supplied to the anode in a highly superstoichiometric ratio. This means that when the methanol/water mixture passes through, only a small portion of the methanol is oxidized at the anode. This in turn has the result that the methanol concentration is not changed substantially between the inlet and the outlet of the gas distribution structure, which means that for several cycles the methanol/water mixture concentration is not adapted to the power consumed.

A methanol fuel cell of a fuel cell system according to the general concept of claim 1 is described in the article by Manfred Waidhas: "Methanol-Brennstoffzellen" (Methanol Fuel Cells) published in Brennstoffzellen: Entwicklung, Technologie, Anwendung/Konstantin Ledjeff (editor), first edition, Heidelberg: Müllelr, 1995 ISBN 3-7880-7514-7, pages 137, 148. The fuel cell system described there, to be sure, is used for experimental purposes. It is therefore not designed for rapid load changes since no rapid changes in the methanol concentration are necessary in experimental operation. The methanol is supplied by a metering pump (FIG. 10-9) to the anode cycle.

SUMMARY OF THE INVENTION

In order to solve the above presented problem, i.e. to design the fuel cell system in such a way that the concentration of methanol in the anode cycle can be rapidly adapted to a varying electric power consumption, it is proposed that a device (hereinafter methanol-separator) be present in the anode cycle of a fuel cell with the features of the generalizing part of claim 1 for reducing the content of methanol and that the first metering device be connected to the inlet segment of the anode cycle between said methanol-separator and the inlet to the fuel distribution system at the anode. This arrangement makes possible the following process for controlling the system:

The methanol-separator (i.e. device for reducing the methanol content) holds the concentration at a relatively low level at all times, and the concentration of methanol in a mixture with a relatively low concentration can be increased by supplying methanol thereto before the inlet to the fuel cell. If a high concentration is necessary in the fuel cell system, a large amount of methanol is supplied; in the case when a low concentration is required, if necessary, the mixture of methanol can be totally stopped.

The anode and cathode of the fuel cell are connected to each other by an electric circuit from which variable power can be taken off, the concentration of a first effluent at one outlet of the methanol-separator being set at a value which is suitable for operating a fuel cell in the case of a low power takeoff.

The methanol necessary for supply the anode cycle can, on the one hand, be taken from a methanol tank of the first metering device containing pure methanol, and on the other hand, from a secondary cycle which receives a second effluent comprising a highly concentrated methanol/water mixture accumulating in the methanol-separator in which case a mixture tank present in the secondary cycle is connected via a second metering device to the inlet segment of the anode cycle.

In steady state operation the flow of materials of the anode cycle and the secondary cycle are totally mixed with each other again. In this way at the inlet to the fuel cell, one obtains once more the concentration which was present at the outlet from the fuel cell. The spent methanol is replaced form the methanol tank. If more power is required, the total concentration can be increased by the further addition of methanol from the methanol tank; if less power is needed the metering of methanol from the methanol tank stops. In addition, the secondary cycle is blocked so that only the lean mixture passes from the anode cycle to the fuel cell. If more power is required than corresponds to the lean mixture, at first a richer mixture is fed in from the secondary cycle again. If this is no longer sufficient, pure methanol is again metered in from the methanol tank.

In order to be able to lower the concentration even further if necessary or in order to have means for better controlling the increase in concentration in the anode cycle, the inlet segment is connected via a third metering device to a water tank.

The fuel cell system is now operated in such a way that, depending on the power consumption, the first and second metering devices are controlled in such a way that by supplying methanol through the first metering device or a highly concentrated methanol/water mixture via a second metering device the methanol concentration at the inlet to the fuel cell distribution system can be raised to a value which corresponds to the power demand in each case. This has the result that in steady operation, the material streams of the anode cycle and the secondary cycle are totally mixed with each other once more. In this way, the concentration at the fuel cell inlet is adjusted back to a value which was present at the outlet from the fuel cell. To the extent that methanol is oxidized on the anode, a corresponding amount of methanol is supplied by the first metering device. If the power demand increases, by adding methanol via the first metering device the total concentration can be instantaneously increased.

When the power demand diminishes, the metering through the second metering device is gradually reduced or entirely shut off so that the lean mixture is supplied to the fuel cell at the one outlet of the methanol-separator. If no more power is required at all the concentration can be further reduced instantaneously by supplying water to the anode cycle via the third metering device.

As the device for reducing the methanol concentration, several possibilities exist which may involve a single step or multistep distillation or membrane separating procedures. In these procedures, heat is required which is available in the system itself as waste heat from the fuel cell stack. In this way, additionally, the heat balance of the fuel cell system can be suitable regulated.

BRIEF DESCRIPTION OF THE DRAWINGS

The invention will be explained in more detail below with reference to an example of the embodiment.

For this purpose the single FIGURE shows a schematic representation of a fuel cell system in the form of a circuit diagram.

DESCRIPTION OF THE PREFERRED EMBODIMENT

Figure 1:
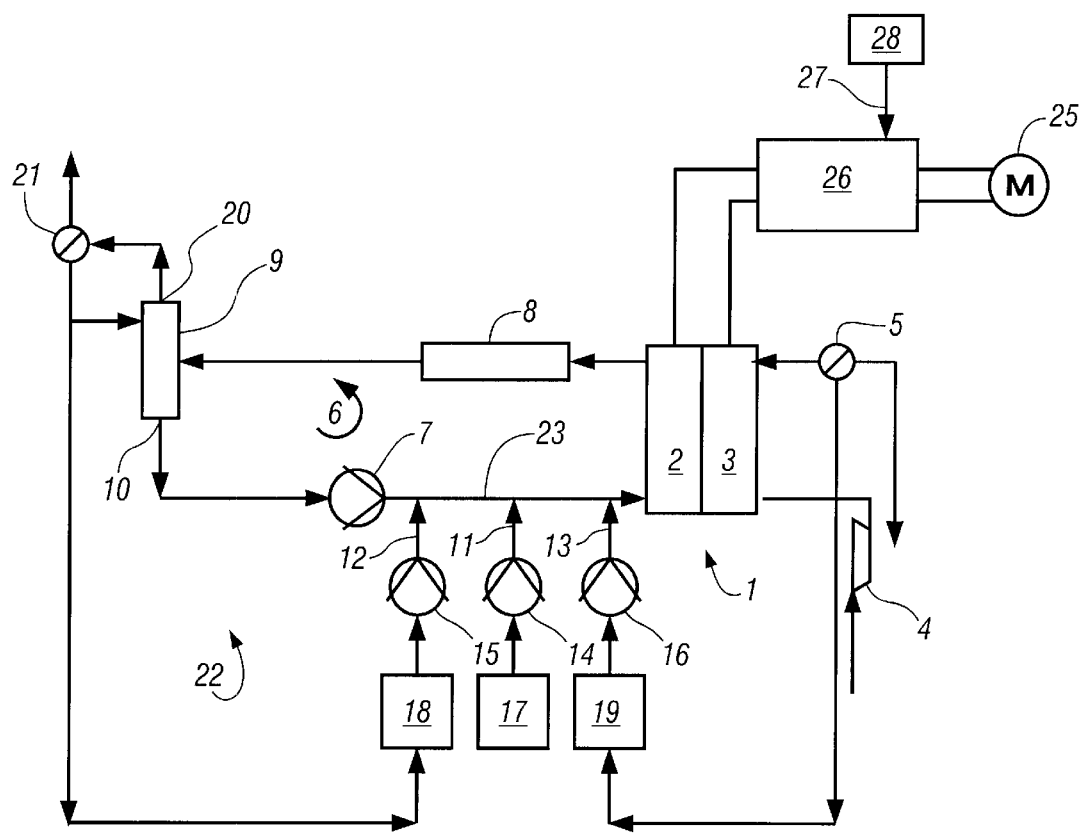

In the center of the fuel cell system is a direct methanol fuel cell (DMFC) 1 with an anode 2 and a cathode 3. The fuel cell 1 is representative for a whole stack of individual fuel cells which are arranged in series to form a so-called stack and are separated from one another by bipolar plates. The individual cells are electrically connected in series in order to represent a sufficiently high electrical voltage. Each individual cell consists of a polymer membrane as electrolyte. This membrane is coated with electrodes on both sides which are the anode 2 on the one hand and the cathode 3 on the other. Through a gas distributor system or liquid distributor system, not shown in detail, the anode is supplied with a methanol/water mixture and the cathode is supplied with air oxygen. At the anode, the methanol is oxidized while at the cathode, the air oxygen is reduced, at which time an ion exchange takes place through the polymer membrane and an electron exchange takes place through the outer current circuit.

The cathode 3 is supplied with air oxygen by a compressor 4. At the outlet from the gas distributor system for the cathode is a condenser 5 which condenses out the reaction water taken from the air oxygen. The water thus obtained is returned as described below to the fluid balance of the fuel cell system.

The gas distributor structure on the anode 2 is part of a main cycle 6 in which a methanol/water fuel mixture is pumped in circulation. For this purpose the main cycle has a circulation pump 7 whose pressure side is connected to the inlet of the distributor structure at the anode 2 for pumping a first stream of methanol-water into the distribution system. The methanol/water mixture flows through the distributor structure to the outlet and is exhausted therefrom as a second stream into a cooler 8 and further to a methanol-separating column 9 where methanol is separated from the mixture. At the outlet 10 of the methanol-separating column 9, which is connected to the suction side of the circulation pump 7, therefore, a first effluent is present comprising a low methanol concentration methanol/water mixture (i.e. having a methanol concentration less than the first stream exiting the fuel distribution system). Therefore the anode cycle is closed.

In the inlet to the anode 2 and in the segment 23 of the anode cycle between the circulating pump 7 and the anode 2, three metering lines 11, 12, 13 open, each with its own metering pump 14, 15, 16. The first metering pump 14 is connected to a methanol tank 17 containing pure methanol. The second metering pump 15 is connected to a mixture tank 18 which is connected to a second outlet 20 on the methanol-separating column 9 which outputs a second effluent comprising a methanol/water mixture in high methanol concentration. The connection runs through a gas separator 21. The third metering pump 16 is connected to a water tank 19 which is connected among others to the condenser 5 on the cathode cycle.

The separating column 9, the second tank 18 and the second metering pump 15 form a secondary circulation system 22 by which a highly concentrated methanol/water mixture which has been branched off from the main cycle 6 in the separating column 9 is returned in it at the inlet to the anode 2.

The fuel cell or the fuel cell stack is plugged into an electric circuit, with the electrical energy taken off from it being supplied to a vehicle drive motor 25. The power taken off in each case is determined by an electronic sensor 26 which is controlled by the operator of the vehicle by a corresponding setting device, not shown here. The electrical power taken off is sent as a current or a power magnitude via a signal line 27 to an electronic evaluating unit 28 which contains information concerning the optimal relationship between the power consumed and the methanol concentration in the anode 2. The metering pumps 14, 15, 16 are controlled by this relationship, but also use additional information to generate the modulating signals, which information is supplied, for example, by sensors, not shown here, for determining the methanol concentration in the main cycle 6 and in the secondary cycle 22. This information can if necessary, however, also be generated by monitoring the power demand and the duration of the modulation of the metering pumps in each case.

The control system can be represented as an example by reference to a specific situation.

A) Constant Power Taken Off

The separating column 9 is adjusted in such a way that the circulating pump 7 supplies a methanol/water mixture of low concentration with a base concentration below that required at the anode 2. The base concentration corresponds to the value which is optimal at a low power takeoff.

In order to obtain the required concentration at the anode, from the mixture tank 18 through the second metering pump 15, a highly concentrated methanol/water mixture is supplied which, if necessary, is supplemented with pure methanol from the methanol tank by actuation of the first metering pump 14. In this way that concentration is reached at the anode which is optimal for the power demand in each case. Part of the methanol is oxidized or consumed at the anode.

On the separating column 9, the concentrated methanol/water mixture is divided, with a lean mixture being supplied at the outlet 10 of the circulating pump 7, while an enriched mixture is returned to the mixture tank 18 and there fed back through the second metering pump 15 to the main cycle.

Finally in this operating mode the methanol/water mixture is separated into two streams of different concentration and brought back together, at which time only the spent methanol is replenished from the methanol tank 17. The secondary cycle in this case acts as a buffer for methanol which can be switched on and off as needed.

B) Increased Power Demand

In this situation by supplying methanol from the methanol tank 17, the concentration at the anode can be raised instantaneously. After this, the process takes place according to A), such that only the spent methanol is replenished.

C) Reduced Power Demand

Corresponding to the decrease in power, the metering via the second metering pump 15 is slowed down so that in the case of a low power demand only a weakly enriched mixture is supplied to the outlet 10 of the separating column of the anode. At the same time the pumping speed of circulation pump 7 can be increased in order to drive the still enriched mixture at the anode out of the fuel cell stack quickly. Here the advantage of the arrangement is obvious: since the necessary concentration at the anode in each case is reached by metering in, an adaptation to the power demand in question can be made quickly since it is only necessary to stop the metering.

D) No Power Consumed

In order to bring the concentration of methanol in the main cycle below a base concentration, water can be fed into the anode cycle by a third metering pump. In this way, the concentration can be extremely reduced instantaneously.

What is claimed is:

1. A fuel cell system comprising a fuel cell having an anode, a cathode, and a polymer membrane interjacent said anode and cathode, a fuel supply circuit for supplying a fuel comprising methanol and water to said anode, said fuel supply circuit including (1) a fuel distribution system for exposing said anode to said fuel, said fuel distribution system having an inlet for receiving a first stream of said fuel and an outlet for exhausting a second stream of said fuel from said fuel distribution system, (2) a pump for circulating said fuel through said circuit, (3) a methanol-separator downstream of said outlet for separating methanol from said second stream and producing a first effluent having a methanol content less than the methanol content of said second stream, and (4) a metering device between said methanol-separator and said inlet for adding methanol to said first effluent to enrich said first effluent and constitute said first stream.

2. A fuel cell system comprising a fuel cell having an anode, a cathode, and a polymer membrane interjacent said anode and cathode, a fuel supply circuit for supplying a fuel comprising methanol and water to said anode, said fuel supply circuit including (1) a fuel distribution system for exposing said anode to said fuel, said fuel distribution system having an inlet for receiving a first stream of said fuel and an outlet for exhausting a second stream of said fuel from said fuel distribution system, (2) a pump for circulating said fuel through said circuit, (3) a methanol-separator downstream of said outlet for separating methanol from said second stream and producing a first effluent having a methanol content less than the methanol content of said second stream and a second effluent having a methanol content greater than said second stream, and (4) a metering device between said methanol-separator and said inlet for adding said second effluent to said first effluent to constitute said first stream.

3. A fuel cell system comprising a fuel cell having an anode, a cathode, and a polymer membrane interjacent said anode and cathode, a fuel supply circuit for supplying a fuel comprising methanol and water to said anode, said fuel supply circuit including (1) a fuel distribution system for exposing said anode to said fuel, said fuel distribution system having an inlet for receiving a first stream of said fuel and an outlet for exhausting a second stream of said fuel from said fuel distribution system, (2) a pump for circulating said fuel through said circuit, (3) a methanol-separator downstream of said outlet for separating methanol from said second stream and producing a first effluent having a methanol content less than the methanol content of said second stream and a second effluent having a methanol content greater than said second stream, (4) a first metering device between said separator and said inlet for adding said second effluent to said first effluent to help constitute said first stream, and (5) a second metering device between said methanol-separator and said inlet for adding pure methanol to said first effluent to help constitute said first stream.

4. A fuel cell system comprising a fuel cell having an anode, a cathode, and a polymer membrane interjacent said anode and cathode, a fuel supply circuit for supplying a fuel comprising methanol and water to said anode, said fuel supply circuit including (1) a fuel distribution system for exposing said anode to said fuel, said fuel distribution system having an inlet for receiving a first stream of said fuel and an outlet for exhausting a second stream of said fuel from said fuel distribution system, (2) a pump for circulating said fuel through said circuit, (3) a methanol-separator downstream of said outlet for separating methanol from said second stream and producing a first effluent having a methanol content less than the methanol content of said second stream and a second effluent having a methanol content greater than said second stream, (4) a first metering device between said separator and said inlet for adding said second effluent to said first effluent as needed to help constitute said first stream, (5) a second metering device between said separator and said inlet for adding pure methanol to said first effluent as needed to help constitute said first stream, and (6) a third metering device between said methanol-separator and said inlet for adding water to said first effluent as needed to help constitute said first stream.

5. A fuel cell system according to claim 4 including a condenser for condensing water out of an exhaust stream from said cathode, and supplying it to said third metering device.

6. A fuel cell system according to claim 1 including a controller for modulating said metering device to adjust the methanol concentration in said first stream to the power demands placed on the fuel cell.

7. A fuel cell system according to claim 2 including a controller for modulating said metering devices to adjust the methanol concentration in said first stream to the power demands placed on the fuel cell.

8. A fuel cell system according to claim 3 including a controller for modulating said metering devices to adjust the methanol concentration in said first stream to the power demands placed on the fuel cell.

9. A fuel cell system according to claim 4 including a controller for modulating said metering devices to adjust the methanol concentration in said first stream to the power demands placed on the fuel cell.

10. A fuel cell system according to claim 2 including a gas separator between said methanol-separator and said metering device to degas said second effluent.

11. Method of operating a fuel cell having an anode, a cathode, a polymer electrolyte interjacent said anode and cathode, and a fuel supply circuit for supplying a fuel comprising methanol and water to said anode, said fuel supply circuit comprising a fuel distribution system for exposing said fuel to said anode, and a methanol-separator for separating methanol from water, comprising the steps of:

(a) introducing a first stream of fuel comprising a first concentration of methanol in water into an inlet to said fuel distribution system, said first concentration being sufficient to support a first power demand placed on the fuel cell;

(b) withdrawing a second stream of said fuel from an outlet from said fuel distribution system, said second stream having a second concentration of methanol less than said first concentration;

(c) removing a portion of said methanol from said second stream in said methanol-separator to provide a first effluent having a third methanol concentration less than said second concentration, and a second effluent having a forth concentration of methanol greater than said second concentration; and (d) adding methanol to said first effluent between said methanol-separator and said inlet to reconstitute said first stream.

12. A method according to claim 11 wherein pure methanol is added to said first effluent at step (d).

13. Method according to claim 11 wherein said second effluent is added to said first effluent in step (d).

14. Method according to claim 11 wherein the methanol added to said first effluent is provided by a source selected from the group consisting of pure methanol and said second effluent.

15. Method according to claim 11 including adding pure water to said first effluent to further dilute the methanol content thereof.

16. Method according to claim 15 wherein said cathode discharges water-laden tailgases, and said pure water is recycled from said tailgases.

* * * * *